US008892500B2

(12) United States Patent
Anderson et al.

(10) Patent No.: US 8,892,500 B2
(45) Date of Patent: Nov. 18, 2014

(54) METHOD AND APPARATUS FOR ASSISTING WITH CONSTRUCTION OF DATA FOR USE IN AN EXPERT SYSTEM

(75) Inventors: John Stewart Anderson, Bristol (GB); Richard William Manley, Bristol (GB); Tim Hughes, South Gloustershire (GB); Mark James Phillip Drake, Wiltshire (GB)

(73) Assignee: BAE Systems PLC, London (GB)

( * ) Notice: Subject to any disclaimer, the term of this patent is extended or adjusted under 35 U.S.C. 154(b) by 1201 days.

(21) Appl. No.: 12/084,737

(22) PCT Filed: Sep. 5, 2007

(86) PCT No.: PCT/GB2007/003339
§ 371 (c)(1),
(2), (4) Date: Jul. 30, 2009

(87) PCT Pub. No.: WO2008/029126
PCT Pub. Date: Mar. 13, 2008

(65) Prior Publication Data
US 2009/0327207 A1      Dec. 31, 2009

(30) Foreign Application Priority Data

Sep. 7, 2006   (EP) ..................................... 06254673
Sep. 7, 2006   (GB) ................................... 0617587.1

(51) Int. Cl.
*G06F 17/00*   (2006.01)
*G06N 5/04*    (2006.01)
*G06N 5/02*    (2006.01)
*G06N 7/00*    (2006.01)

(52) U.S. Cl.
CPC ................. *G06N 5/022* (2013.01); *G06N 7/005* (2013.01); *G06N 7/00* (2013.01)
USPC ........................................................ 706/60

(58) Field of Classification Search
USPC ........................................................ 706/60
See application file for complete search history.

(56) References Cited

U.S. PATENT DOCUMENTS

| | | | |
|---|---|---|---|
| 5,774,121 A * | 6/1998 | Stiegler ........................... | 715/769 |
| 6,345,265 B1 * | 2/2002 | Thiesson et al. ................ | 706/52 |
| 2003/0063779 A1 | 4/2003 | Wrigley et al. | |
| 2005/0049986 A1 * | 3/2005 | Bollacker et al. ............... | 706/46 |

FOREIGN PATENT DOCUMENTS

| | | |
|---|---|---|
| GB | 2377513 | 7/2001 |
| GB | 2358264 | 5/2003 |

OTHER PUBLICATIONS

Srinivas, Sampath "A Generalization of the Noisy-Or Model" UAI'93 Proceedings of the Ninth international conference on Uncertainty in Artificial intelligence 1993. [Online] Downloaded Apr. 18, 2012   http://xenon.stanford.edu/~srinivas/research/6-UAI93-Srinivas-Generalization-of-Noisy-Or.pdf.*

(Continued)

*Primary Examiner* — Ben Rifkin
(74) *Attorney, Agent, or Firm* — Kenyon & Kenyon LLP

(57) ABSTRACT

A display device to display a representation of a set of states, each one of the states being associated with a corresponding variable. Each of the states displayed is designated as being a most significant state for the corresponding variable. Input representing a probability estimate to be associated with a displayed state is entered and used to generate data for use in an expert system.

28 Claims, 9 Drawing Sheets

(56) References Cited

OTHER PUBLICATIONS

Tu et al "The Adaptive Safety Analysis and MOnitoring System" Proceedings of SPIE 2004. [ONLINe] Downloaded Apr. 18, 2012. http://www.engr.uconn.edu/~sas03013/docs/SPIE_ASAM.pdf.*

U.K. Patent Office, Search Report, Nov. 29, 2006, from related UK Patent Application No. GB 0617587.1, filed Sep. 7, 2006.

European Patent Office, European Search Report, Oct. 30, 2006, from related European Patent Application No. EP06254673.4, filed Sep. 7, 2006.

Anonymous, "Bayesialab 3.0 Tutorial" Bayesia SA, Dec. 31, 2004, Paragraphs 0001-02.2.

Kokkonen, T. et al., "A method for defining conditional probabilities tables with link strength parameters for Bayesian network" Modsim 2005, Dec. 15, 2005, Paragraphs 00OI, 00II.

Anonymous, "White Paper" Deriveit, Apr. 13, 2004, www.deriveit. com, retrieved on Oct. 13, 2006, Whole document.

European Patent Office, International Search Report and Written Opinion, Nov. 5, 2008, from International Patent Application No. PCT/GB2007/003339, filed on Sep. 14, 2007.

Hope et al., "Knowledge Engineering Tools for Probability Elicitation," (Jun. 4, 2002), Technical Report of School of Computer Science and Software Engineering, Monash University, pp. 1-10.

Zagorecki et al., "An Empirical Study of Probability Elicitation under Noisy-OR Assumption," (Dec. 31, 2004), Proceedings of the Seventeenth International Florida Artificial Intelligence Research Society Conference, the whole document.

Druzdel et al., "Building Probabilistic Networks: Where do the Numbrs Come From?," (Dec. 31, 2000), IEEE Transactions on Knowledge and Data Engineering, pp. 481-486.

European Patent Office, International Preliminary Report on Patentability and Written Opinion, Mar. 10, 2009, from International Patent Application No. PCT/GB2007/003339, filed on Sep. 5, 2007.

\* cited by examiner

METHOD AND APPARATUS FOR ASSISTING WITH CONSTRUCTION OF DATA FOR USE IN AN EXPERT SYSTEM

RELATED APPLICATION INFORMATION

This application is a United States National Phase Patent Application of, and claims the benefit of, International Patent Application No. PCT/GB2007/003339 which was filed on Sep. 5, 2007, and which claims priority to British Patent Application No. 0617587.1, which was filed on Sep. 7, 2006 and European Patent Application No. 06254673.4, which was filed on Sep. 7, 2006, the disclosures of each of which are incorporated herein by reference.

FIELD OF THE INVENTION

The present invention relates to assisting with construction of data for use in an expert system.

BACKGROUND INFORMATION

Expert systems are used for a wide range of applications, including medical diagnosis, fault finding, etc. Expert systems are so named because they process data relating to a number of input conditions to derive a solution that closely matches that obtained by the thought process of an expert in the relevant field who is trying to solve a given problem in that domain. When an expert system is being constructed the knowledge of an expert needs to be captured and encoded into a knowledge base. This process involves eliciting knowledge from an expert, typically by means of an extended interview process.

Known types of expert systems utilize Bayesian networks. The construction of a Bayesian network requires a model of the problem domain to be created. By establishing links between knowledge variables the model captures the way in which the state of one variable is affected by the status of its parents. Some of the probabilities for the links between a particular variable and its parents can be difficult for an expert to provide. Further, there can often be far too many probabilities to elicit in an interview of reasonable length with an expert. There is therefore a desire to reduce the amount of data that needs to be elicited from the expert, whilst maintaining the accuracy of the generated Bayesian network.

SUMMARY OF THE INVENTION

According to a first aspect of the present invention there is provided apparatus adapted to assist with constructing data describing a Conditional Probability Table, the apparatus including: a display device for displaying a representation of a set of states, each one of the states being associated with a corresponding variable, wherein each of the states displayed is designated as being a most significant state for the corresponding variable; an input device for receiving an input representing a probability estimate to be associated with a said displayed state, and a component for using the inputted probability estimates to generate data describing a Conditional Probability Table.

Typically, the most significant state for a variable will relate to the presence or absence of the attributes described by the variable (normally as deemed to be the case by an expert).

One of the variables may represent a hypothesis node in a graphical model of a Bayesian network and the other variables can represent nodes in the model whose states determine the state of the hypothesis node (e.g. parent nodes of the hypothesis node). The display may include a representation of a combination of the states of the parent nodes. The combination can include the state of one of the parent nodes being in its most significant state and the state of each of the other parent nodes not being the most significant state (that is, the other parent nodes are in states which are not their most significant states). Thus, other combinations of states do not need to be considered at all. The combination may further include the states of all the parent nodes not being in their most significant states. Thus, the inputted probability estimates may only be required for these combinations.

The data describing the Conditional Probability Table generated will normally include the remaining combinations of the states of the parent nodes, i.e. the states that were not displayed (and for which probability estimates were not inputted by a user). The Conditional Probability Table may be generated by means of the apparatus implementing a "Noisy-OR" algorithm.

The apparatus may include a component for allowing a graphical representation of the variables to be created. The states displayed may be those of a variable chosen by selecting its said corresponding graphical representation.

The apparatus may configure the display to display the states of the parent nodes in an order determined by the probability estimates associated with each of the states as inputted using the input means. The apparatus may include a component for allowing the user to set an initial order in which the states of the parent nodes are displayed.

The apparatus may generate and display a question corresponding to the state for which a probability estimate is to be entered using the input means. The question can include text comprising a name of at least one said state of at least one corresponding said parent node and a name of the state of the hypothesis node.

The apparatus may include a component for automatically setting the probability estimate for a state reciprocal to the state for which a probability estimate is entered so that the combined probability estimates sum to 1.

The apparatus may include a component that only allows the Conditional Probability Table data to be generated after probability estimates for all the displayed combinations of states have been inputted.

According to another aspect of the present invention there is provided a method of assisting with constructing data describing a Conditional Probability Table, the method including: displaying a representation of a set of states, each one of the states being associated with a corresponding variable, wherein each of the states displayed is designated as being a most significant state for the corresponding variable; receiving an input representing a probability estimate to be associated with a said displayed state, and generating data describing a Conditional Probability Table using the inputted probability estimates.

According to yet another aspect of the present invention there is provided a computer program product comprising a computer readable medium, having thereon: computer program code means, when the program code is loaded, to make the computer execute a procedure to: display a representation of a set of states, each one of the states being associated with a corresponding variable, wherein each of the states displayed is designated as being a most significant state for the corresponding variable; receive an input representing a probability estimate to be associated with a said displayed state, and generate data describing a Conditional Probability Table using the inputted probability estimates.

The method may include constructing a graphical model of a problem domain, the model including a set of nodes corresponding to at least some of the variables that exist in a problem domain and links between at least some of these nodes. The method may further include creating data representing the states of a said variable.

The input may be based on information elicited by an expert during an interview process.

According to a further aspect of the invention there is provided a method of assisting with constructing data describing a Conditional Probability Table, the method including: prompting a user to input data representing a set of probability estimates to be associated with a set of states, each one of the states being associated with a corresponding variable, and using the inputted data to generate a Conditional Probability Table, wherein the inputted data corresponds to a subset of the Conditional Probability Table.

According to another aspect of the invention there is provided a method of constructing data for use in an expert system, the method including: constructing a graphical model of a problem domain, the model including a set of nodes and links between at least some of the nodes; entering probability estimates associated with at least one state of at least some of the nodes; generating probability estimates for at least some of the remaining links in the model, and generating data for use in an expert system using the constructed model, the entered probability estimates and the generated probability estimates.

According to another aspect of the invention there is provided apparatus for implementing the method of constructing data for use in an expert system substantially as described above. A computer program product comprising a computer readable medium, having thereon computer program code means, when the program code is loaded, to make the computer execute a procedure corresponding to the method may also be provided.

According to yet another aspect of the invention there is provided a method of generating a set of probability estimates for a state of a child variable having a plurality of possible states, the state of the child variable being dependent upon states of a plurality of parent variables, wherein each of the parent variables has a plurality of possible states, with one of the possible states of each said parent variable being designated as a most significant state for that parent variable, the method including: assigning a probability estimate indicating a likelihood of the state of the child variable resulting from each of the following combinations of the states of the parent variables: the state of all the parent variables is not the most significant state; the state of one of the parent variables is the most significant state whilst the state of all the other parent variables is not the most significant state, with this combination of parent variable states being produced for each one of the parent variables, and using a Noisy-Or algorithm to generate a set of probability estimates indicating the likelihood of the state of the child variable resulting from at least some other combinations of the states of the parent variables.

The method may further include using the assigned probability estimates and the generated set of probability estimates to generate a Bayesian Network representing the relationship between the parent and child variables.

The parent variables are assumed to be independent variables (i.e. ones that are considered to be non-overlapping, or verified as variables that can contribute to determining the state of the child variable along with the other parent variable).

The child variable may represent a risk that an individual onboard a vehicle is malevolent. The parent variables may represent characteristics of the individual, e.g. behaviour onboard the vehicle, security background checks. The child variable may represent a risk that there is an opportunity for a malevolent act to be committed onboard a vehicle.

According to yet another aspect of the invention there is provided an apparatus adapted to assist with constructing data describing a Conditional Probability Table, the apparatus including: a display device for displaying a representation of a set of states, each one of the states being associated with a corresponding variable, wherein each of the states displayed may be designated as being a most significant state for the corresponding variable; an input device for receiving an input representing a probability estimate to be associated with a said displayed state, and a component for using the inputted probability estimates to generate data describing a Conditional Probability Table.

According to yet another aspect of the invention there is provided a method of assisting with constructing data describing a Conditional Probability Table, the method including; displaying a representation of a set of states, each one of the states being associated with a corresponding variable, wherein each of the states displayed may be designated as being a most significant state for the corresponding variable; receiving an input representing a probability estimate to be associated with a said displayed state, and generating data describing a Conditional Probability table using the inputted probability estimates.

According to yet another aspect of the invention there is provided a computer program product comprising a computer readable medium, having thereon: computer program code means, when the program code is loaded, to make the computer execute a procedure to: display a representation of a set of states, each one of the states being associated with a corresponding variable, wherein each of the states displayed may be designated as being a most significant state for the corresponding variable; receive an input representing a probability estimate to be associated with a said displayed state, and generate data describing a Conditional Probability Table using the inputted probability estimates.

Whilst the invention has been described above, it extends to any inventive combination of the features set out above or in the following description. Although illustrative embodiments of the invention are described in detail herein with reference to the accompanying drawings, it is to be understood that the invention is not limited to those precise embodiments. As such, many modifications and variations will be apparent to practitioners skilled in this art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

DETAILED DESCRIPTION

Figure 1:
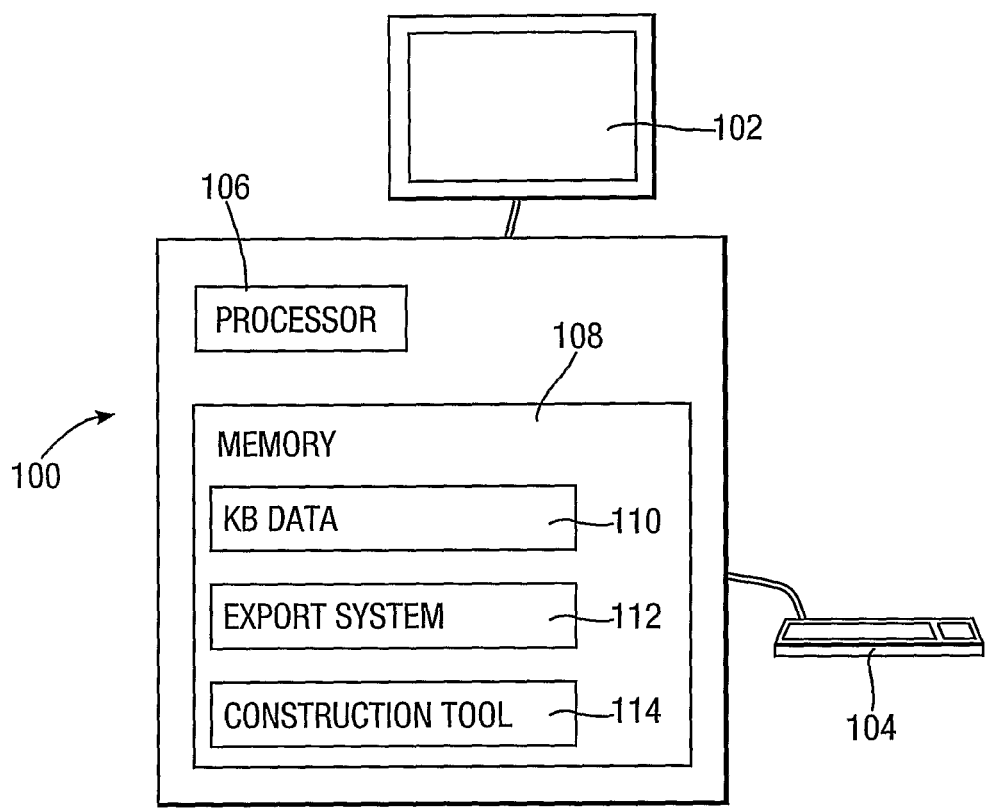
FIG. 1 illustrates schematically a computer configured to execute a tool according to an embodiment of the present invention.

The invention may be performed in various ways, and, by way of example only, embodiments thereof will now be described, reference being made to the accompanying drawings, in which:

FIG. 1 illustrates a computer 100 that has an associated display device 102 and user interface means 104. It will be understood that the system described herein can be implemented using a wide range of conventional computers, e.g. a personal computer, laptop computer, etc having any type of display device and user interface means, e.g. a keyboard and/or pointer device.

The hardware associated with the computer 100 includes a processor 106 and memory 108. In the example, the memory 108 is configured to store knowledge base data 110, expert system application software 112 and expert system data construction tool 114.

Figure 2:
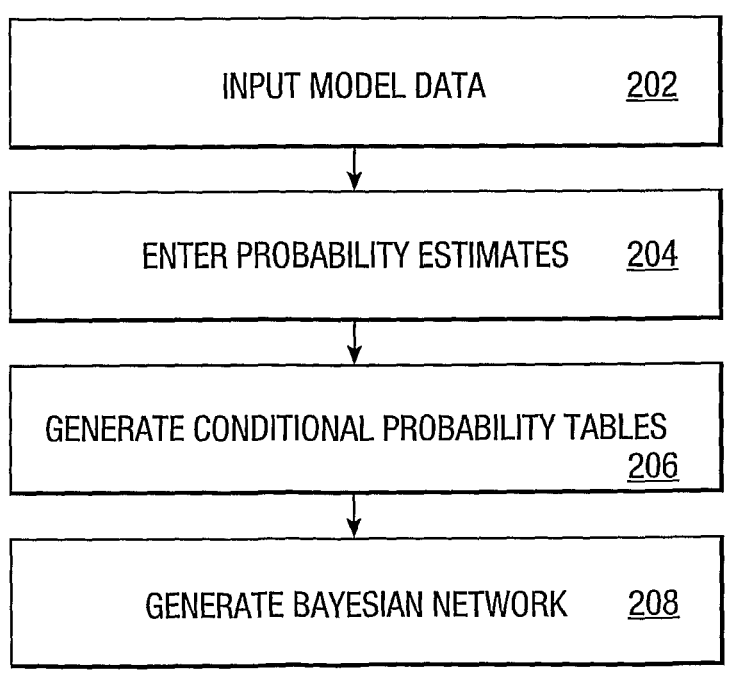
FIG. 2 illustrates schematically steps performed by the tool.

FIG. 2 outlines steps performed by the expert system data construction tool 114. In the described embodiment the tool is implemented by means of software written in the well-known Java programming language. At step 202 data describing a model relating to a problem domain is inputted. This can involve either recalling a previously saved model from a file or creating a model using a user interface provided by the tool 114. If a model is being constructed then this will usually involve a user of the tool interacting with an expert. Alternatively, an expert may be trained to use at least some aspects of the tool directly.

A user/interviewer may take some preliminary steps when preparing to use the tool for model creation. For example, he may frame questions appropriate to the problem at hand in such a manner so as to assist with the creation of a graphical representation of the model comprising nodes and links as described below.

Typically, the first main stage of the model creation process will involve eliciting information from the expert that is intended to allow a graphical representation of the model to be created. The questioning may be performed in a structured manner so that questions intended to elicit "nodes" from the expert are asked first. Then, the (important) states for each elicited node is determined. The interviewer may make a record of all the elicited nodes, their types and their states, either on paper or electronically. The user may then rationalize the list of nodes with the expert's input with the intention of removing duplication and identifying which of the nodes are parent or child nodes in the model. The user can then build the model using the model creation user interface, described below. It will be appreciated that this can either be performed manually by the user, possibly with further input from the expert.

During a second main stage of the model creation process the interviewer reviews the model with the expert. This can involve eliciting information from the expert that could form the basis of an alternative hypothesis to a certain hypothesis that is already included in the model. The alternative hypotheses elicited from the expert may be rationalized by the user and links could be established from the alternative hypotheses to context and evidence variables that may already be created in the model. The rationale for all the links that have been made by the expert may be recorded. It will be understood that some of these steps could be re-visited later on during the model creation process.

Next, the expert is asked to provide probability estimates for states of interest within the model and at step 204 probability estimates relating to the model inputted are provided. At step 206 the tool 114 generates conditional probability tables based on the model and probability estimated data. At step 208 a Bayesian network is generated using the conditional probability tables.

Figure 3:
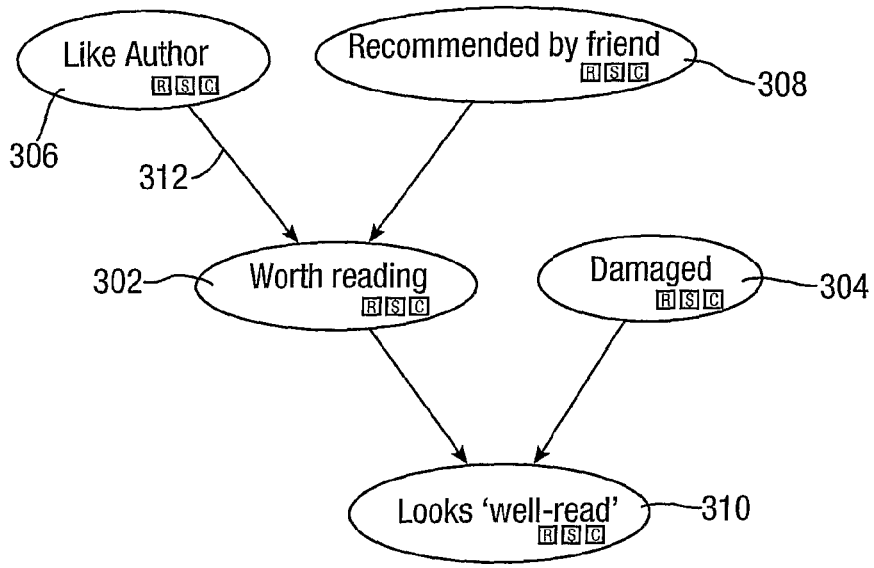
FIG. 3 shows an example of a graphical model of a problem domain.

For background information, a description of how a problem domain is conventionally represented for a Bayesian network will now be given. An example of a graphical model of a problem domain is shown in FIG. 3. The model includes nodes 302-310 that represent variables in the problem domain. Each node has a finite list of states, which are the values that the node may have. Nodes are usually categorized according to their role in the model as one of the following:

Hypothesis nodes 302 are nodes of interest, i.e. the situations which the users of the system want to 'Discover'. Alternative hypothesis nodes 304 represent other possible explanations for the context and evidence variables observed.

Context nodes 306, 308 represent background information, which is usually available before inference begins and so pre-conditions the probability of the hypothesis (and alternative hypothesis) nodes.

Evidence nodes 310 correspond to variables that can be observed in situ in some problem domains.

Directed arrows, e.g. 312, show how nodes in the model influence each other. The nodes and their associated links provide the structure of the resulting Bayesian network. It is recommended that the nodes be positioned in a three-layer structure:

Context

Hypotheses; Alternative Hypotheses

Evidence

If this three-layer structure is maintained, then influence works downwards, and inference works upwards. The state of the context nodes influences the state of the hypothesis (or alternative hypothesis) nodes, which in turn influence the state of the evidence nodes. The state of the hypothesis (or alternative hypothesis) nodes can be inferred from the state of the evidence nodes, and that of the evidence nodes from the hypothesis (or alternative hypothesis) nodes.

In the example model of FIG. 3, which relates to the problem domain of a whether a book is worth reading, the Worth Reading node 302 is the hypothesis of interest. Context nodes, Like Author 306 and Recommended by Friend 308, pre-condition the probability that the book is worth reading. A book that is worth reading may have the evidence Looks Well-read (node 310), but a book that looks well read could be Damaged (alternative hypothesis node 304) rather than being worth reading.

Another example of a problem domain is identifying potential terrorist threats on board an aircraft. In this case, the context variables may represent the state of knowledge concerning a passenger or flight prior to the flight leaving the ground. The hypothesis variables may represent the probability of types of terrorist threats and the events that the system is attempting to predict, given the context and background in which evidence is observed. Alternative hypothesis nodes may be used to represent possible alternative explanations for the observed behaviour. Evidence nodes can represent behaviours and actions that may be observed during a flight of the aircraft, either by personnel or sensors.

An explanation of how tool 114 performs the model inputting step 202 will now be given. Model data can either be input from a file storing a model that has already been created, or the tool can be used to create a model (that can be saved for recall/amendment later on). Information regarding an expert who is being consulted during the model creation phase may be associated with the model data. This information may include the name of the expert, his/her occupation, etc. The intention is to build up a database comprising a series of models. An expert may contribute more than one model. For example, in the problem domain of identifying a terrorist threat onboard an aircraft, one model may relate to information provided by the expert regarding how to identify whether a passenger is a potential terrorist, whilst another model may relate to identifying whether there is an opportunity on board the aircraft for a malevolent act to be committed.

Figure 4:
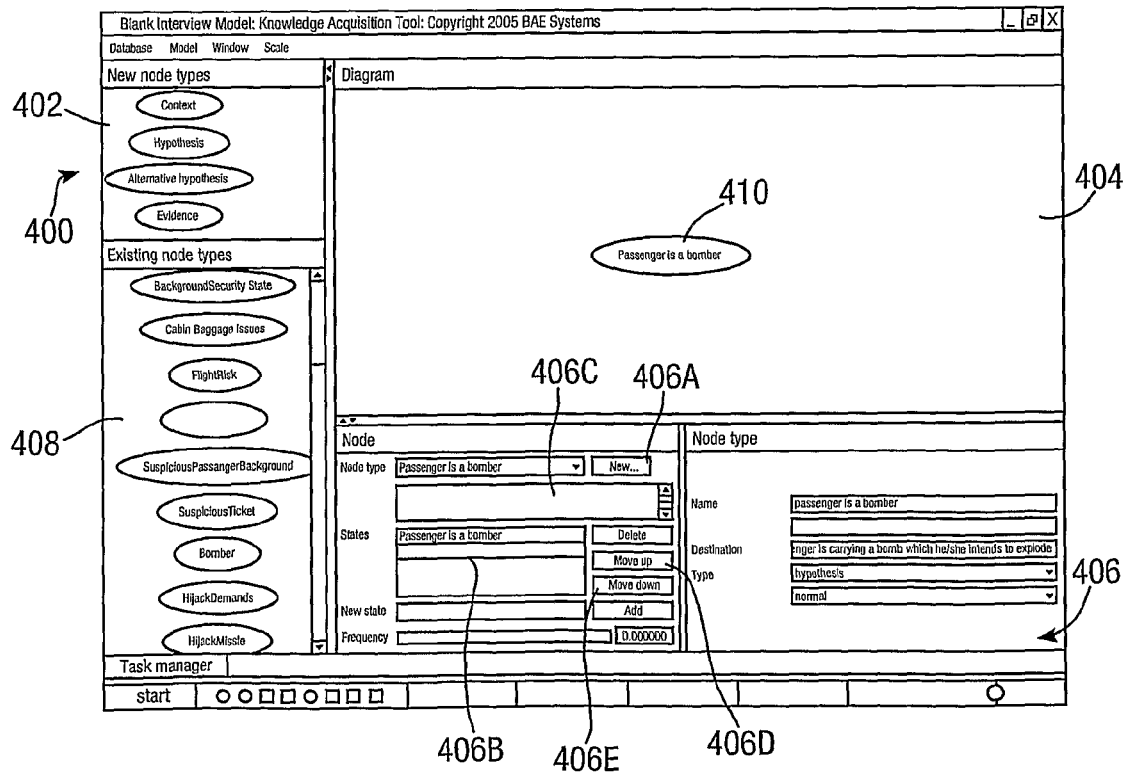
FIG. 4 is an example display of a user interface provided by the tool to allow the creation of a graphical model.

FIG. 4 is an example screen display 400 of a user interface provided by the tool 114 for the creation of a model. The screen display is divided into four main areas 402, 404, 406, 408. Area 402 comprises a set of four generic nodes (i.e. context, hypothesis, alternative hypothesis and evidence nodes) that a user can select and place in a model construction area 404 using the well-known "drag" user interface technique in order to create a specific instance of that type of node, e.g. "Passenger is a Bomber" hypothesis node 410. The nodes in the model may be colour-coded according to their generic types. Nodes can be moved anywhere within the area 404 by dragging to the required location. When a node is moved, it maintains any existing links (discussed below) to other nodes. Other user interface techniques familiar to the skilled person can also be implemented. For instance, multiple nodes can be selected and moved simultaneously by dragging a box around the nodes.

Area 406 is used to enter data relating to a specific node within the construction area 404. The main categories of data that can be entered for a node include a name/node type 406A and the states 406B of the node. Other data, such as the expert's rationale 406C for features of the node can also be provided.

A newly-created node is automatically set up with two default states, e.g. "high" and "low". These states names may not be appropriate in all cases and it is usual for the expert to give the states more meaningful names. As will be described below, the tool 114 can automatically parse the names of states into a "sentence" that is intended to be readable by a user/expert later on during the interview procedure. Having the expert provide meaningful names for states at the model creation stage can make the interpretation of this sentence easier. For example, rather than naming the states "bomber"/ "not a bomber", the names "passenger is a bomber" and "passenger is not a bomber" are preferred.

It is preferable that nodes be given as few states as possible. It is recommended to try to define a maximum of two states per node. Multiple node states are allowed, but these should be kept to a minimum as they can complicate further analysis by the tool 114.

The node data area 406 further includes state ordering up/down buttons 406D, 406E, which are used to place the states defined for that node in a hierarchy, according to their significance as perceived by the expert. Typically, the most significant state for a node will relate to the presence or absence of the attributes described by the node. It is important that the states of a node are ordered in a certain manner to indicate what is considered by the expert to be the most significant state for that node. In the problem domain of identifying threats onboard an aircraft, for example, the most malevolent (potentially dangerous/damaging) state is usually determined to be the most significant state in the list of states. The most significant state may be highlighted, e.g. shown in red, on the display.

Area 408 comprises a list of the specific instances of nodes that have been created for the model. These can be selected for editing using the node data area 406, or dragged into the construction area 404.

Figure 5:
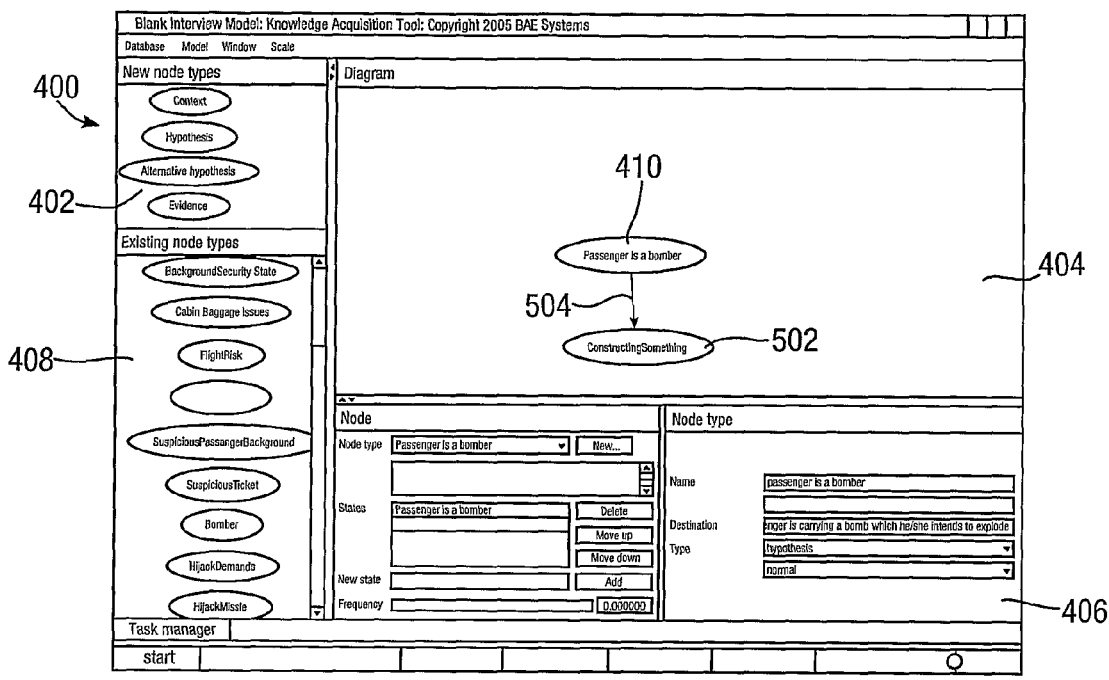
FIG. 5 shows how the interface allows links to be created between nodes in the model.

The tool 114 also allows links to be created between nodes, as illustrated in FIG. 5. Links represent probabilistic relationships between one node and another within the model. Links are defined by the expert being interviewed. A link should exist between two nodes where one node can be said to have a direct (causal) influence over another node. In the example, the fact that a passenger is a bomber is seen as a potential cause of the evidence node "constructing something" node (node 502) and so an arrow 504 is placed from the "passenger is a bomber" hypothesis node 410 to the node 502. The arrowhead on the link indicates its direction of influence. Typically, links will flow from a context node to a hypothesis (or alternative hypothesis) node to an evidence node.

Figure 6:
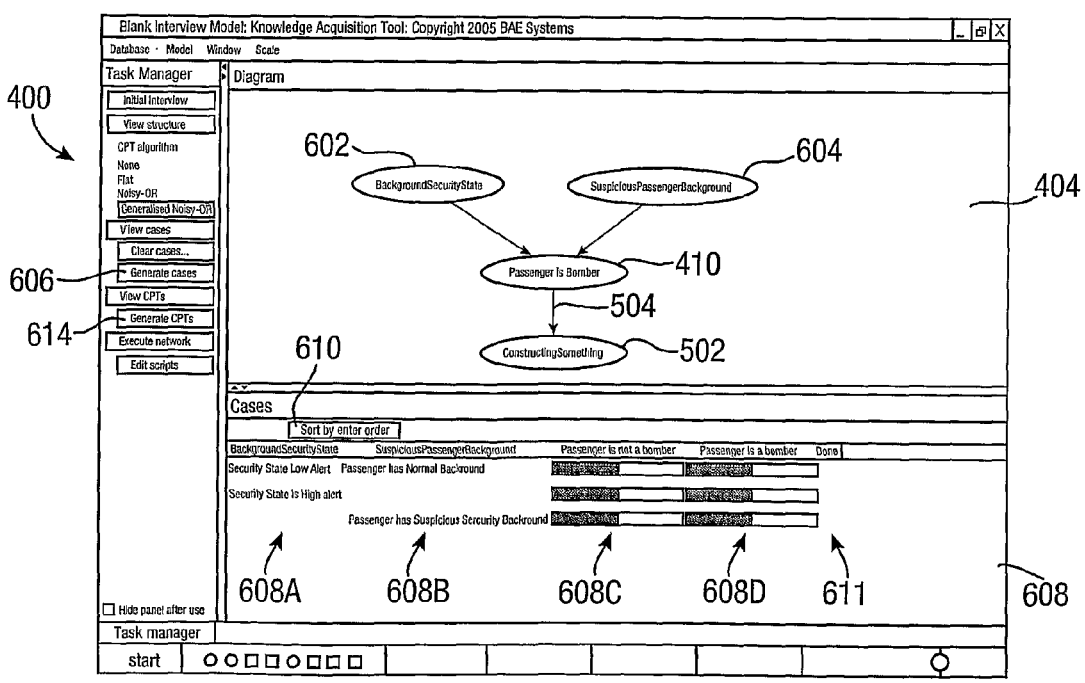
FIG. 6 shows how the interface includes a table that allows states of nodes in the model to be selected for input of associated probability estimates.

When all the required nodes and links have been elicited from the expert and the links have been connected up in the model according to the expert's knowledge, the expert is then required to provide probability estimates. This can be done using the user interface features shown in FIG. 6. In FIG. 6, context type nodes 602 and 604 that are linked to hypothesis node 410 of FIG. 5 have been added to the model using the techniques described above.

Selecting the "generate cases" button 606 causes the tool 114 to display a "case matrix" table 608 relating to the node currently selected in area 402. A "case" is a combination (or set) of states and represents a single scenario that could occur in the real world/problem domain. Given that scenario/case, the expert is asked to estimate the probability of the occurrence of the states of a variable that is selected from the case matrix table 608. As discussed below, the tool 114 is configured to collect probability estimates of the nature "Given variable 1 in state a) and Variable 2 is in State b) (Case 1), what is the probability that variable 3 will adopt state c)?"

In the example, the selected node is the "passenger is a bomber" hypothesis node 410. This table is intended to show only some of the combinations of the states of the parent nodes of the selected nodes that lead to the determination of the state of the selected node itself. The left-hand side of the table 608 includes columns, each of which is headed by one of the parent nodes of the selected node. The rows in each of the columns relate to the state of that column's node. Thus, the two (context type) parent nodes 602, 604 of the selected hypothesis node 410 are shown in two columns 608A, 608B in table 608.

The combinations of states displayed in the rows of the table are as follows:

The states of all the nodes is not their most significant states (top row in the example)

Figure 6A:
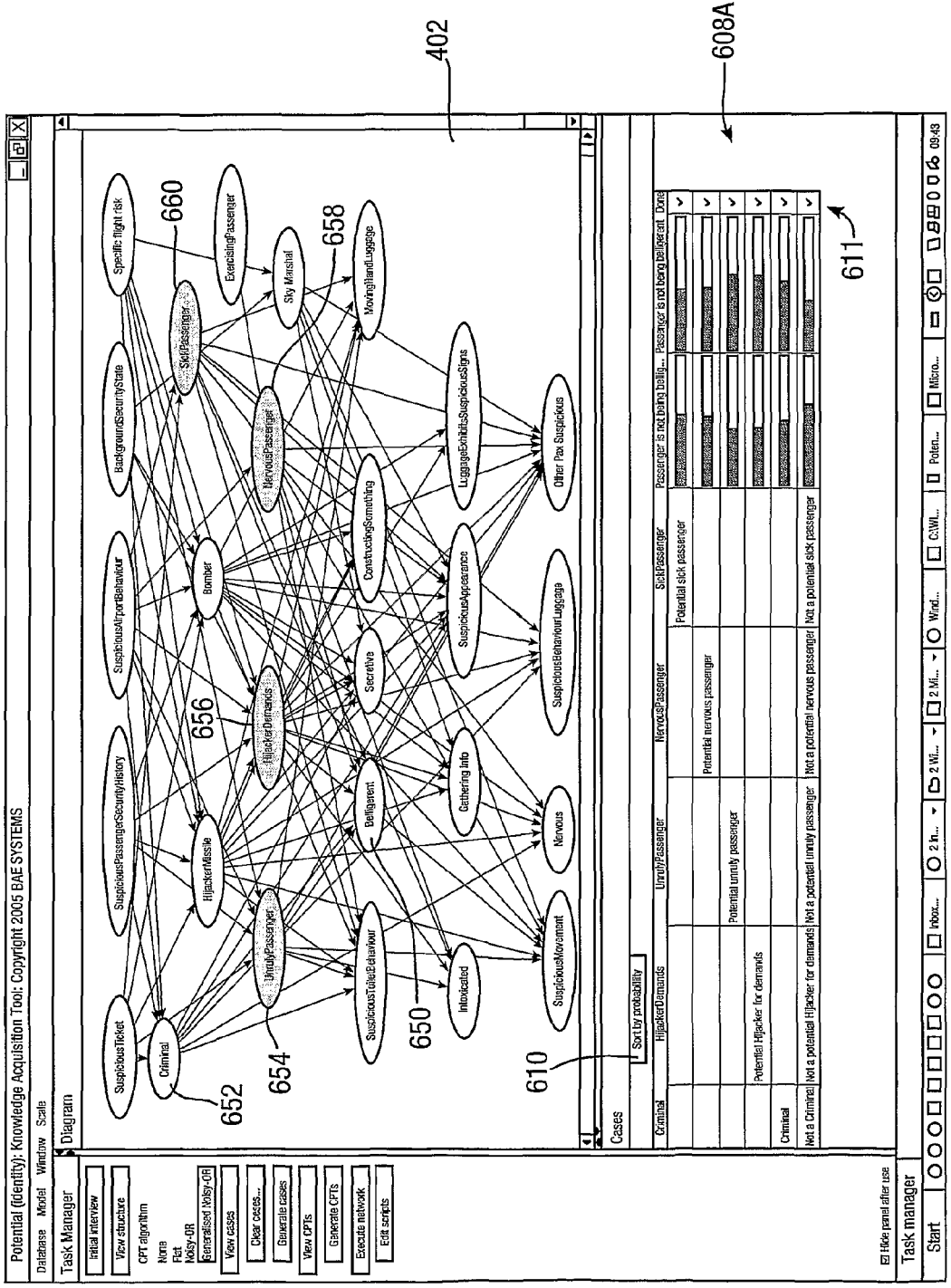
FIG. 6A shows a similar view to that of FIG. 6, but for a more complex example of a model.

The state of one of the nodes is its most significant state, whilst the states of the other/remaining nodes are not their most significant states (bottom two rows in the example). This combination is produced for all of the nodes. FIG. 6A shows an example of a more complex model where a "belligerent" node 650 has five parent nodes 652-660. The final/bottom row in the table 608A shows the case where the states of all five parent nodes are not in their most significant states, whilst the upper five rows in the table illustrate the cases where only one of the parent nodes is in its most significant state.

Thus, for a selected node having N parent nodes, there will be $$\left(\sum_{i=1}^{n} NumberofStatesof(ParentNode_i) - 1\right) + 1$$

rows in the corresponding case matrix table. The expert is asked to provide a probability estimate for the state of the selected node 410 dependent on all the combinations of its parent nodes shown in the table (only). As will be described below, the tool uses the probability estimates entered for the combination of states shown in the table 608 to generate probability estimates for the state of the selected node depending upon other parent nodes state combinations that are not in the table. For a line in the table 608 featuring the states of N variables the total number of combinations generated will be <Number of states>^<Number of nodes>. The complete CPT has one row for every combination of states of the parent nodes. For example, if the selected node has five parents, each with two states, the number of rows is 2×2×2× 2×2 (=32). If one of the parents had three states then the number of rows would be 3×2×2×2×2 (=48). Eliciting probability estimates for only a relatively low number of state combinations is considered to be a major benefit provided by the tool 114. This provides an advantage not only in a reduction of the length of time taken for the expert interview process, but also reduces the amount of user-inputted data that needs to be processed by the system.

Figure 7:
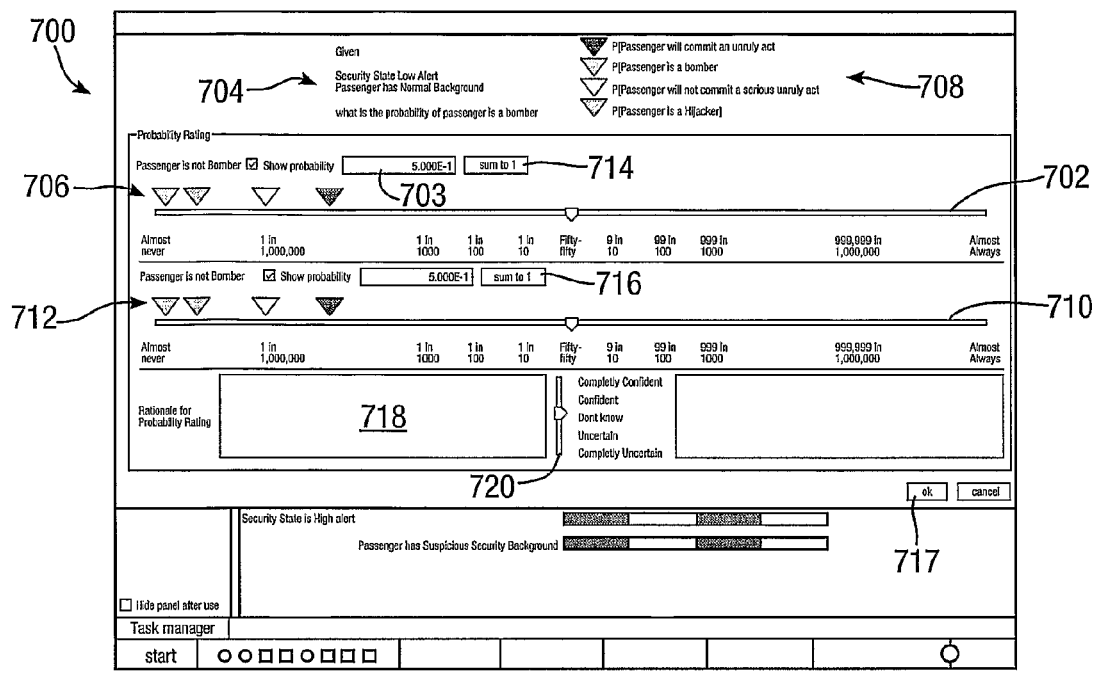
FIG. 7 shows how the interface allows probability estimates to be entered for a selected node/state.

Entering a probability estimate is initiated by selecting one of the rows in the table, which causes the tool 114 to display the probability input dialog box 700 shown in FIG. 7.

At area 704 of the dialog box a computer generated "sentence"/phrase produced by the tool 114 is displayed. This can be constructed generally as follows:

"Given" <the names of the (parent nodes') states in the selected row> "what is the probability of" <the name of the state of the selected node>

Thus, for the selected state "passenger is a bomber" in table 608 of FIG. 6, the generated sentence will read as follows:

"Given:
security state low alert,
passenger has normal background,
what is the probability of passenger is a bomber?"

Such a human-readable phrase is intended to make it easier for the expert to understand which probability estimate he is being asked to provide.

The dialog box 700 includes a first slider 702 that a user can use to enter a probability estimate. The probability estimate can be represented in any conventional manner and in the example the range "almost never" through to "almost always" is given, with intermediate values, e.g. "1 in 1,000,000", "1 in 100", "50-50", "99 in 100", "999,999 in 1,000,000" also being shown. It will be appreciated that any other user input technique, e.g. directly entering a figure representing a probability can be used. At area 703 the absolute value of the selected probability is shown, although this feature can be switched off if desired by un-checking the adjacent checkbox.

Adjacent the first slider 702 there can be several markers that are intended to indicate the background probabilities of certain events relating to the problem domain. The probabilities associated with these markers have been calculated from empirical statistics and are designed to assist the expert in making estimates of probability relative to the background probabilities. The markers 706 can be colour-coded and a key that shows the corresponding events is displayed at area 708. If the selected node is an evidence type node then these types of markers considered inappropriate (as they can mislead the expert and result in artificially low probabilities) and are omitted from the dialog box.

The dialog box 700 can also include a second slider 710. The second slider can be used to enter a probability estimate for the reciprocal of the state represented by the first slider 702. For instance, when the first slider 702 is used to set the probability estimate for the "passenger is a bomber" state, whilst the second slider 710 is used to enter the probability estimate for the "passenger is not a bomber" state. Markers 712 to similar to markers 706 can be displayed adjacent the second slider 710.

A "sum to 1" button 714 is located adjacent the first slider 702. This can be used to automatically set the probability estimate for the second slider 702 to a reciprocal value. A corresponding "sum to 1" button 716 is also provided for the second slider 710. The "OK" button 717 of the dialogue box 700 may be disabled when the elicited probabilities do not sum to one to protect against erroneous inputs.

At the bottom of the dialog box 700 an area 718 is provided to record text giving the expert's rationale for the probability estimate. A further slider 720 that can be used to record a rating representing the expert's confidence in the probability estimate he has provided can also be optionally included in the dialog box 700. It will be appreciated that in other embodiments the probability estimates could be inputted in other ways, e.g. recalled from a saved file. It will be appreciated that the dialog box 700 is only one example of how probability estimates can be inputted. In alternative embodiments, the user may be required to enter the estimates in a predetermined order (with only one or some of the states/ variables concerned being displayed at any one time) rather than being allowed to select one of the rows of the table 608.

Returning to FIG. 6, on completing entry of all of the probability estimates for a row in the table 608, a tick may be displayed in the corresponding row of a right-hand "done" column 611 adjacent the table, which indicates that a valid probability estimate has been input for that row. As can also be seen in FIG. 6, to the right of the columns 608A and 608 there are two bars 608C, 608D representing the probability estimates entered for the two states of the selected node.

Figure 8:
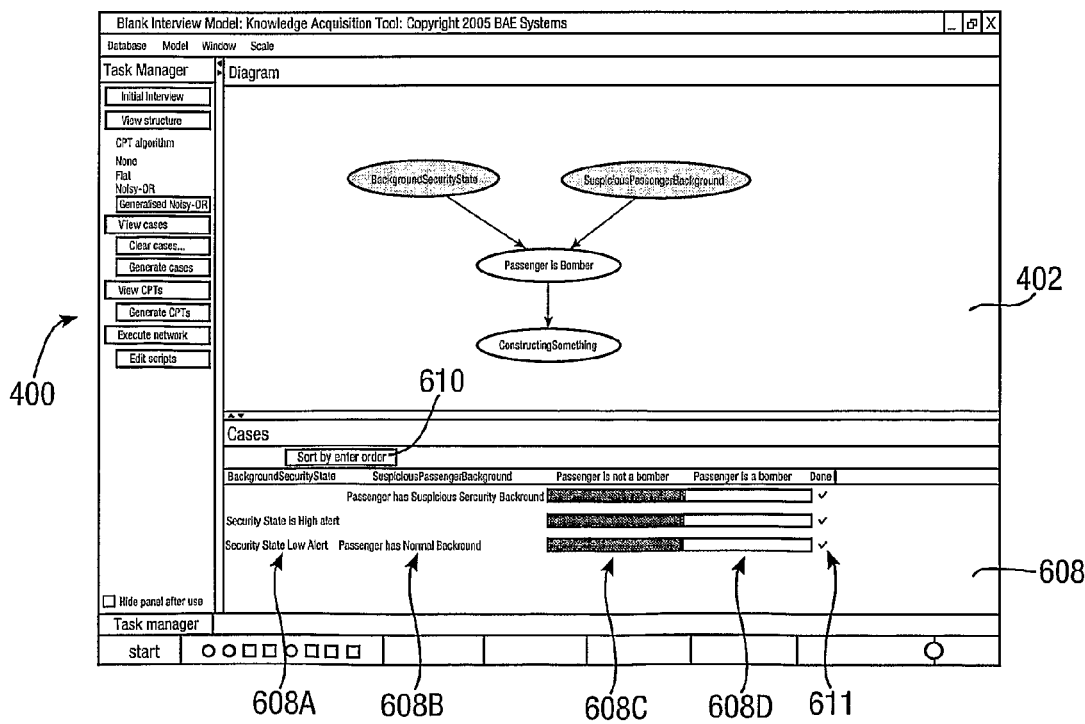
FIG. 8 shows how the interface allows cases (combinations of variable states) shown in the table to be re-ordered according to the probabilities entered.

When all of the rows in the table have had valid probability estimates entered, it can be useful to review the relative order of the elicited probabilities with the expert to validate his responses prior to moving on to the next node. This can be done by clicking the "sort by probability" button 610. This reorders the rows in the table 608 according to the probabilities assigned to each in descending order (most probable first), as shown in FIG. 8. Pressing button 610 again will revert the order of the rows to the order in which their probabilities were entered.

Figure 9:
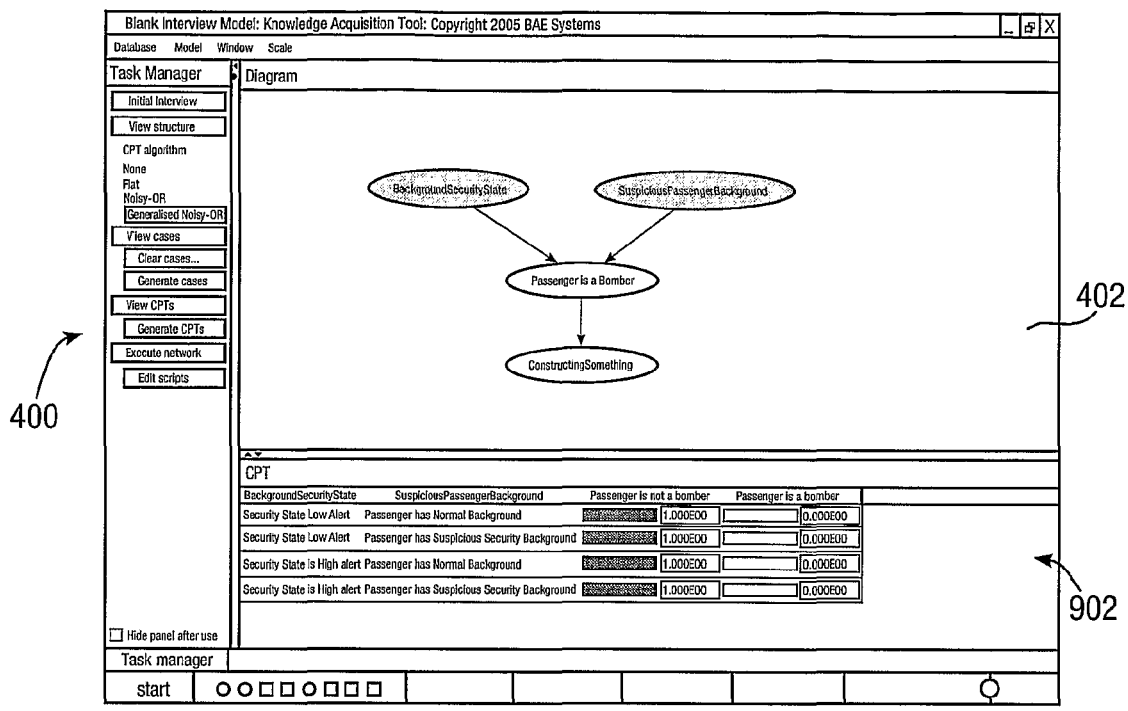
FIG. 9 shows a Conditional Probability Table generated by the tool that corresponds to the example model shown in FIG. 6.
Figure 9A:
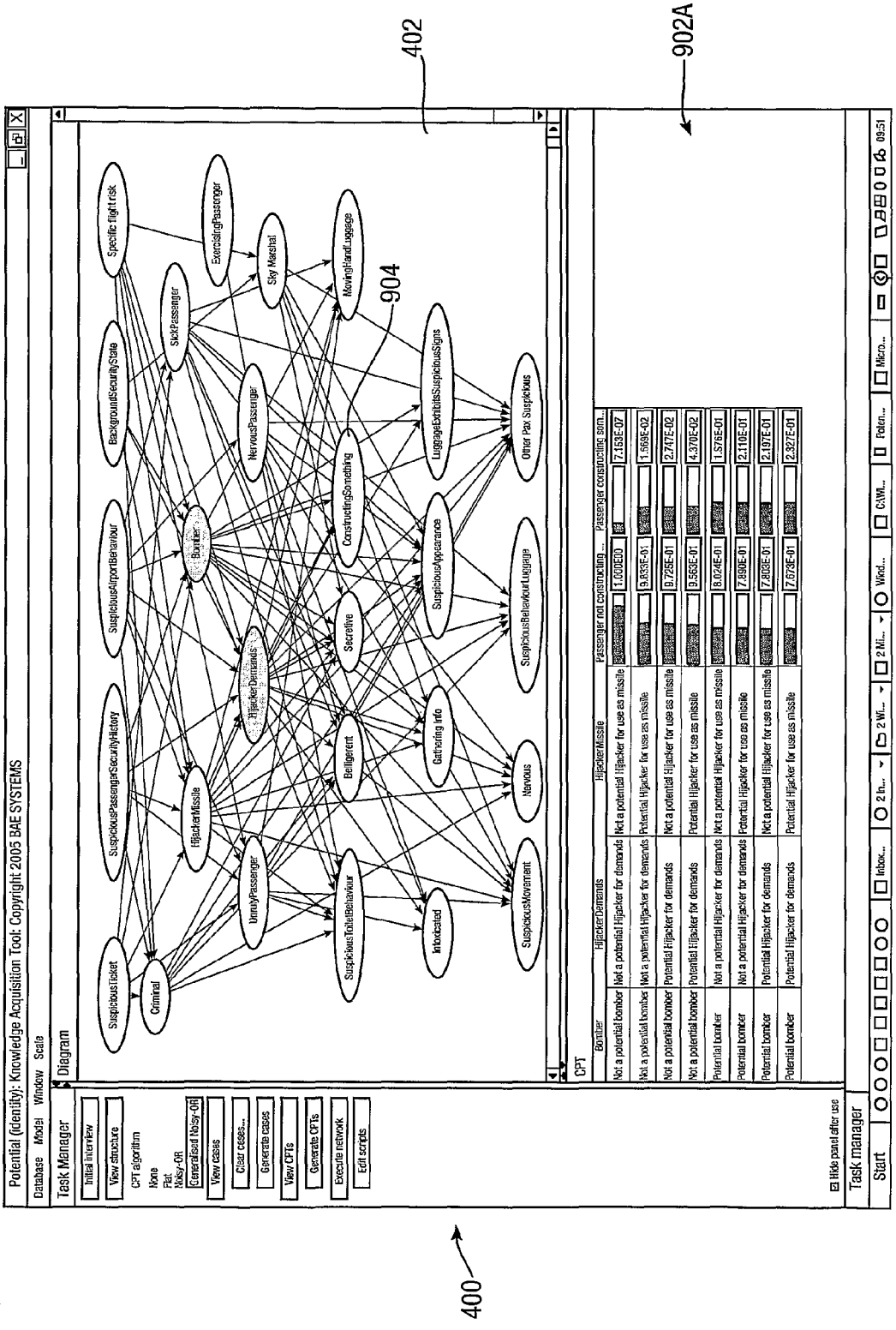
FIG. 9A shows a more complex example of a Conditional Probability Table.

When all probability estimates have been entered for tables for the required nodes in the model, the next step is normally to generate Conditional Probability Tables (CPTs). This process is initiated in the tool 114 by selecting the "generate CPTs" button 614. A CPT 902 corresponding to the example nodes of FIG. 6 generated by the tool is shown in FIG. 9. FIG. 9A shows a more complex example of a model with a CPT 902A for a "constructing something" hypothesis node 904.

The tool 114 produces the CPTs by means of an algorithm commonly called "Noisy-OR" and information to explain how this can be implemented will now be given. The Noisy-OR formulation makes the following three assumptions:

1. All of the nodes are graded variables. A variable is graded if it can be absent or present with varying degrees of freedom. A variable with states [Absent, Low, Moderate, High] is graded, but a variable with states [Red, Green, Blue] is probably not.

2. When all of the causes of a variable are absent, the variable is also absent. In practice this is not a significant restriction because a 'leak' cause can be added to agglutinate the causes which are not modelled. The leak cause acts like 'background radiation' in the problem domain.

3. All of the causes of a variable are independent. A node X and its causes U interact according to the Noisy-OR equation:

$$P(X \leq x \mid u_1, \ldots, u_n = \prod_i P(X \leq x \mid U_i = u_i, U_k = u_0, \forall k \neq i)$$

Under these assumptions, a complete CPT can be generated from relatively few probabilities. Let X have cases $x_0, \ldots, x_m$ (where $x_0$ is Absent), and let cause $U_i$ have states $u_0, \ldots, u_n$ (where $u_0$ is Absent). Then the expert needs to provide a probability for each combination of $x_i$ and $u_j$ as follows:

$$c_{x_j}^{u_i} = P(X = x_j \mid U_i = u_i, U_k = u_0, \forall k \neq i) \quad 1 \leq i \leq n, \, 1 \leq j \leq m$$

The Absent probability ensures that the row adds up to 1.

$$c_{x_0}^{u} = 1 - \sum_{j=1}^{m} c_{x_j}^{u} \text{ for all } u.$$

X is absent when all of its causes are absent, so $$c_x^{u_0} = \begin{cases} 1 & \text{for } x = 0 \\ 0 & \text{for } x > 0 \end{cases} \text{ for all } u.$$

Each $c_j^i$ is a parameter for the link. It can be seen that each link requires $(m-1)(n-1)$ probabilities to be elicited. For node X with m states and c children with n states each, the CPT contains $n^c$ rows. If the Noisy-OR assumptions hold, then only $(m-1)(n-1)c$ probabilities are required to fully specify the CPT. Computation of the CPT continues as follows. First, the cumulative probability for each parameter is calculated.

$$C_{x_j}^{u_i} = P(X \leq x_j \mid U_i = u_i, U_k = u_0, \forall k \neq i) = \sum_{x'=0}^{x_j} c_{x_j}^{u_i}$$

Now the Noisy-OR equation can be calculated using the cumulative probabilities.

$$P(X \leq x_j \mid u_1, \ldots, u_n) = \prod_i C_{x_j}^{u_i}$$

Finally, the CPT entries can be calculated from the Noisy-OR values.

$$P(x_j \mid u_1, \ldots, u_n) = \begin{cases} P(X \leq 0 \mid u_1, \ldots, u_n) & \text{if } j = 0 \\ P(X \leq x_j \mid u_1, \ldots, u_n) - P(X \leq x_{j-1} \mid u_1, \ldots, u_n) & \text{if } j > 0 \end{cases}$$

Figure 10:
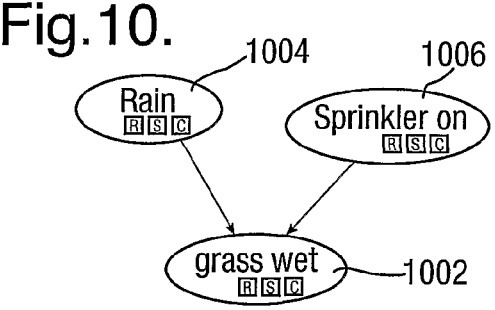
FIG. 10 shows a simple example of node formations to illustrate the functioning of an algorithm used by the tool to generate the Conditional Probability Table.

The Noisy-OR formulation of conditional probability tables is an established method (see, for example, Lemmer, J. F., Gossink, D. E., *Recursive Noisy OR—A Rule for Estimating Complex Probabilistic Interactions*, IEEE Transactions on Systems, Man, and Cybernetics—Part B: Cybernetics, Vol. 34, No. 6, 2252-2261, IEEE 2004, or Díez, F. J., Galán, S. F., *Efficient Computation for the Noisy MAX*, International Journal of Intelligent Systems, Vol. 18, 165-177 (2003), Wiley Periodicals, Inc. 2003). For ease of comprehension, a simple example will now be discussed. The Noisy-OR algorithm gives the intuitively correct answer for very simple node formations, such as the one shown in FIG. 10, which shows a "GrassWet" hypothesis node 1002 that has two parent nodes, namely "Rain" node 1004 and "SprinklerOn" node 1006.

The nodes can have the following states:

| | |
|---|---|
| Rain | no, yes |
| SprinklerOn | no, yes |
| GrassWet | no, yes |

The noisy-OR probabilities are $$c_{GrassWet=yes}^{Rain=yes} = P(G=yes \mid R=no, S=yes) = 0.5$$

$$c_{GrassWet=yes}^{Rain=yes} = P(G=yes \mid R=yes, S=no) = 0.9$$

If the Noisy-OR assumptions hold, then the following CPT is calculated for the GrassWet node:

| R | S | G = no | G = yes |
|---|---|---|---|
| R = no | S = no | 1.0 | 0.0 |
| R = no | S = yes | 0.5 | 0.5 |
| R = yes | S = no | 0.1 | 0.9 |
| R = yes | S = yes | 0.05 | 0.95 |

The interesting entry in this table is the bottom-right probability:

$$c_{GrassWet=yes}^{Rain=yes} = P(R=yes \mid G=yes, S=yes) = 0.95$$

Figure 11:
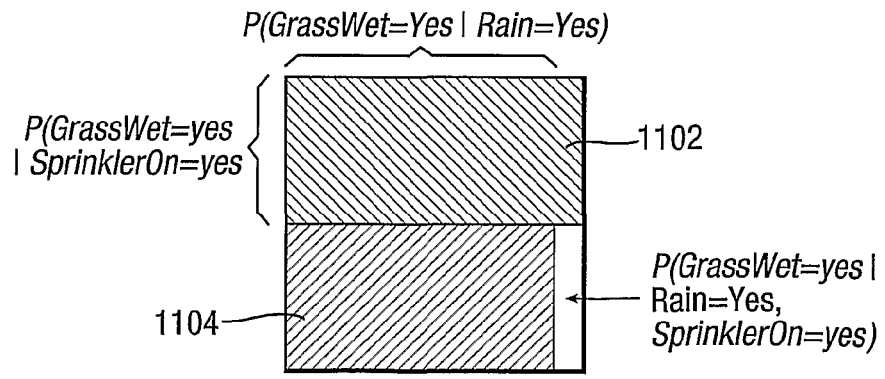
FIG. 11 is a Venn-like diagram related to the nodes of FIG. 10.

This probability can be validated using the Venn-like diagram of FIG. 11. The shaded areas 1102, 1104 show where the grass is wet due to rain and the sprinkler, respectively. The key to the diagram is that rain and the sprinkler are independent. This means that:

$$P(R = \text{yes} \mid G = \text{yes})$$
$$= P(R = \text{yes} \mid G = \text{yes}, S = \text{yes})$$
$$= P(R = \text{yes} \mid G = \text{yes}, S = \text{no})$$

It can be seen that $$c_{GrassWet=yes}^{Rain=yes} = P(R = \text{yes} \mid G = \text{yes}, S = \text{yes})$$

$$= 1 - P(G = \text{no} \mid R = \text{no}, S = \text{yes})$$

$$P(G = \text{no} \mid R = \text{yes}, S = \text{no})$$

$$= 1 - 0.5 \cdot 0.1$$

$$= 1 - 0.05$$

$$= 0.95$$

The right column (G=yes) is filled in by considering the relevant "inhibiting" probabilities from the left column (G=no). The Noisy-OR equations extend this to nodes with more than two states by taking advantage of the grading of each nodes' states. The CPT for a node with states [None, Few, Some, All] is filled in from left-to-right by gradually including more states. First, the node's states can be [<Few, None], then [<Some, Some], then [<All, All], where <Some=None v Few.

Figure 12:
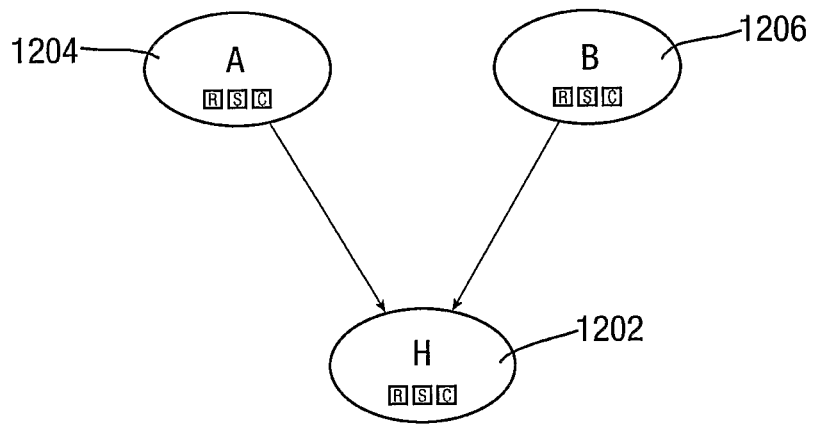
FIG. 12 shows another set of nodes to further illustrate the functioning of the algorithm.

For further background information, a worked example will be given below, with reference to FIG. 12, which shows a hypothesis node H 1202 having two parent nodes, namely node A 1204 and node B 1206.

The nodes can have the following states:

| | |
|---|---|
| A | absent, present |
| B | absent, low, moderate, high |
| H | absent, low, high |

The link parameter are elicited from an expert.

| $c_H^A$ | H = l | H = h |
|---|---|---|
| A = p | 0.2 | 0.7 |

| $c_H^B$ | H = l | H = h |
|---|---|---|
| B = l | 0.2 | 0 |
| B = m | 0.5 | 0.2 |
| B = h | 0.1 | 0.6 |

Remaining combinations are calculated:

| $c_H^A$ | H = a | H = l | H = h |
|---|---|---|---|
| A = a | 1 | 0 | 0 |
| A = p | 0.1 | 0.2 | 0.7 |

| $c_H^B$ | H = a | H = l | H = h |
|---|---|---|---|
| B = a | 1 | 0 | 0 |
| B = l | 0.8 | 0.2 | 0 |
| B = m | 0.3 | 0.5 | 0.2 |
| B = h | 0.3 | 0.1 | 0.6 |

Summing to find the cumulative probabilities:

| $C_H^A$ | H = a | H = l | H = h |
|---|---|---|---|
| A = a | 1 | 1 | 1 |
| A = p | 0.1 | 0.3 | 1 |

| $C_H^B$ | H = a | H = l | H = h |
|---|---|---|---|
| B = a | 1 | 1 | 1 |
| B = l | 0.8 | 1 | 1 |
| B = m | 0.3 | 0.8 | 1 |
| B = h | 0.3 | 0.4 | 1 |

The Noisy-OR values $P(H \leq \{a,l,h\} \mid A, B)$ for each row of the CPT are calculated by multiplying the appropriate cumulative probabilities.

| A | B | H = a | H = l | H = h |
|---|---|---|---|---|
| A = a | B = a | 1 | 1 | 1 |
| A = a | B = l | 0.8 | 1 | 1 |
| A = a | B = m | 0.3 | 0.8 | 1 |
| A = a | B = h | 0.3 | 0.4 | 1 |
| A = p | B = a | 0.1 | 0.3 | 1 |
| A = p | B = l | 0.08 | 0.3 | 1 |
| A = p | B = m | 0.03 | 0.24 | 1 |
| A = p | B = h | 0.03 | 0.12 | 1 |

Finally, the accumulation across values for H can be removed to get the CPT entries.

| A | B | H = a | H = l | H = h |
|---|---|---|---|---|
| A = a | B = a | 1 | 0 | 0 |
| A = a | B = l | 0.8 | 0.2 | 0 |
| A = a | B = m | 0.3 | 0.5 | 0.2 |
| A = a | B = h | 0.3 | 0.1 | 0.6 |
| A = p | B = a | 0.1 | 0.2 | 0.7 |
| A = p | B = l | 0.08 | 0.22 | 0.7 |
| A = p | B = m | 0.03 | 0.21 | 0.76 |
| A = p | B = h | 0.03 | 0.09 | 0.88 |

It will be noted that in practice, many models do not adhere to all of the three assumptions mentioned above, for instance:
  Not all nodes are graded variables.
  A variable may be present when all of its causes are absent. A 'leak' probability can be elicited to account for this discrepancy.
  All of the causes of a variable are independent. In such a case, a different CPT generation algorithm would be needed.

It will be appreciated that the system can be modified to generate CPTs in ways other than (or in addition to) the use of the Noisy-OR algorithm described above. For example, for 'degenerate' cases, a flat probability distribution could be created for every row of every CPT; flat distributions could be automatically used unless the expert provides a case for a specific row (this could involve using an arbitrary combination of variables). An alternative implementation of the Noisy-OR algorithm could also be used.

Step 208 of FIG. 2, i.e. generating a Bayesian network using the generated CPTs, can be implemented by placing the generated CPT data into a suitable format and exporting that data to an application that is capable of producing a Bayesian network. An example of such an existing tool is "Netica", produced by Norsys Software Corp of Vancouver, Canada. The tool 114 can be configured to receive the generated Bayesian network data and display a representation of it on screen.

Figure 13:
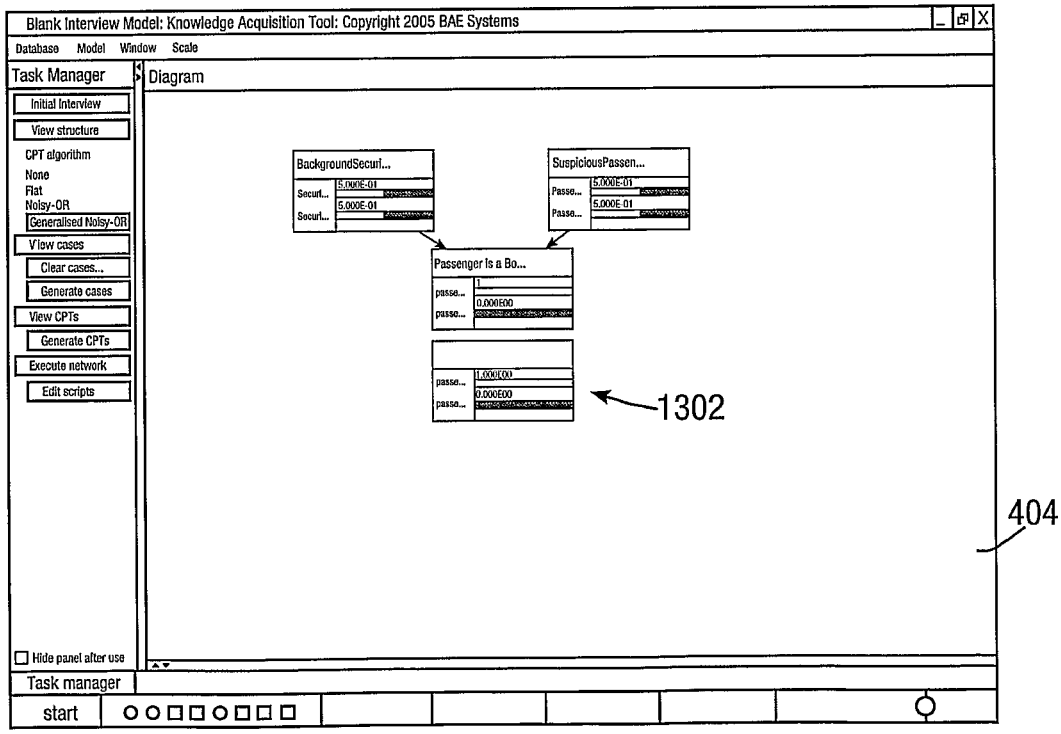
FIG. 13 shows an example of a Bayesian network corresponding to Conditional Probability Table generated by the tool.

FIG. 13 shows an example of a Bayesian network 1302 corresponding to the nodes shown in FIG. 8.

Whilst in the above described embodiments the "Noisy-OR" algorithm is used to produce the Conditional Probability Tables (CPTs), it is to be appreciated that alternative algorithms to "Noisy-OR" (for example, the "OR", "Only One" algorithms) could be used instead, if desired. A simple example will now be presented to demonstrate how in this invention A. the "OR" algorithm and B. the "Only One" algorithm can be implemented, in place of "Noisy-OR".

Examples of Alternatives to "Noisy-OR" Algorithmic Implementation

A. "OR"

The "OR" algorithm requires two probability assessments:
1. All nodes in their least significant state.
2. All nodes in their most significant state.

The first probability applies when all nodes are in their least significant state. The second probability applies to all other state combinations.

Figure 14:
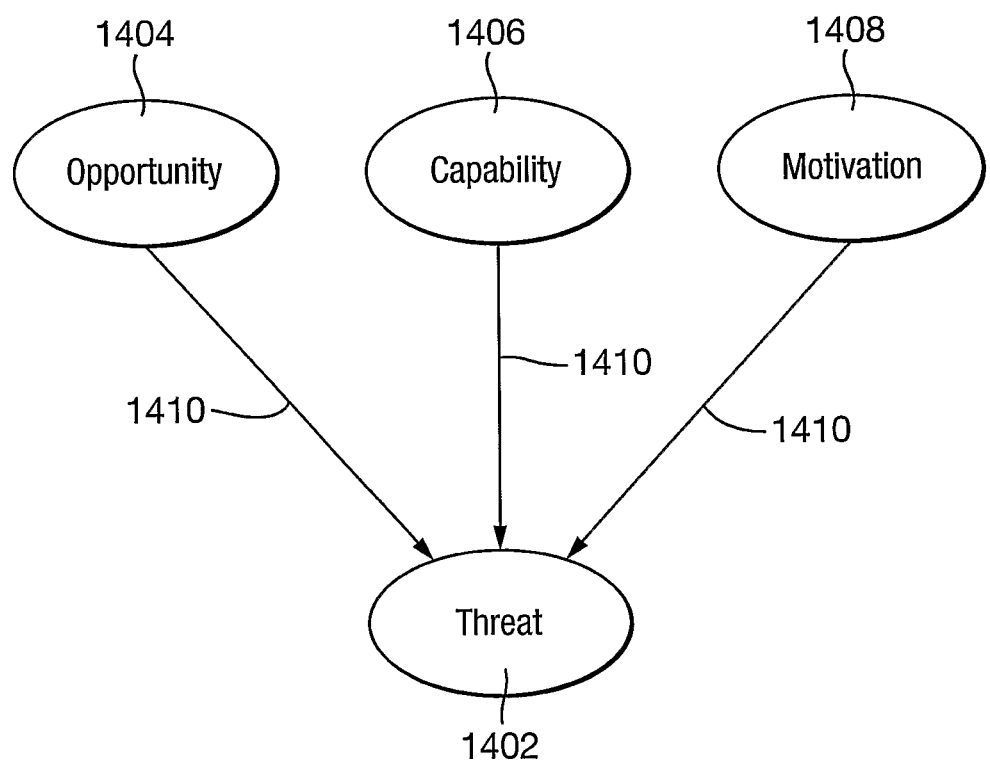
FIG. 14 shows another simple example of node formations to illustrate the functioning of another algorithm used by the tool to generate the Conditional Probability Table.

For example, consider a Bayesian network with simple node formations, such as the one shown in FIG. 14. In the example model of FIG. 14 which relates to the problem domain of identifying a threat, there is shown a "Threat" node 1402 that has three parent nodes, namely "Opportunity" node 1404, "Capability" node 1406, and "Motivation" node 1408. As previously explained in the above described examples, the directed arrows 1410 in the Figure show how the nodes 1402, 1404, 1406, 1408 in the model influence each other.

In this example, the following probabilities can be collected
1. P (Threat|Opportunity=No, Capability=No, Motivation=No)=[0.9, 0.1]
2. P (Threat|Opportunity=Yes, Capability=Yes, Motivation=Yes)=[0.01, 0.99]

Using the "OR" algorithm described in this example results in the following Conditional Probability Table for the "Threat" node 1402:

| | | | Threat | |
|---|---|---|---|---|
| Opportunity | Capability | Motivation | Low | High |
| No | No | No | 0.9 | 0.1 |
| No | No | Yes | 0.01 | 0.99 |
| No | Yes | No | 0.01 | 0.99 |
| No | Yes | Yes | 0.01 | 0.99 |
| Yes | No | No | 0.01 | 0.99 |
| Yes | No | Yes | 0.01 | 0.99 |
| Yes | Yes | No | 0.01 | 0.99 |
| Yes | Yes | Yes | 0.01 | 0.99 |

B. "Only One"

The "Only One" algorithm uses the same probability assessments as the above described "OR" algorithm, but builds a different Conditional Probability Table as shown below, so that the second probability only applies when just one of the parent nodes is in its most significant state (the first probability is used for all other cases).

| | | | Threat | |
|---|---|---|---|---|
| Opportunity | Capability | Motivation | Low | High |
| No | No | No | 0.9 | 0.1 |
| No | No | Yes | 0.01 | 0.99 |
| No | Yes | No | 0.01 | 0.99 |
| No | Yes | Yes | 0.9 | 0.1 |
| Yes | No | No | 0.01 | 0.99 |
| Yes | No | Yes | 0.9 | 0.1 |
| Yes | Yes | No | 0.9 | 0.1 |
| Yes | Yes | Yes | 0.9 | 0.1 |

The invention claimed is:

1. An apparatus to assist with constructing data describing a Conditional Probability Table, comprising:
   a display device to display a representation of a set of states, each one of the states being associated with a corresponding variable, the states being ordered in a hierarchy based on a selected significance level by a user, wherein at least one of the states displayed is designated as being a most significant state for the corresponding variable;
   an input device to receive an input representing a probability estimate to be associated with said displayed state; and
   a component to use the inputted probability estimates to generate data describing a Conditional Probability Table;
   wherein each variable represents a node having a plurality of potential states which are ordered based on the selected significance level by the user, and
   wherein the hierarchy includes nodes positioned in a three-layer structure, which includes a context layer, a hypotheses and alternative hypotheses layer, and an evidence layer, so that influence works downwards and inference works upwards, and wherein the state of the context nodes influences the state of the hypothesis nodes and the alternative hypothesis nodes, which in turn influence the state of the evidence nodes, and wherein the state of the hypothesis nodes and the alternative hypothesis nodes is inferred from the state of the evidence nodes, and the state of the evidence nodes is inferred from the hypothesis nodes and the alternative hypothesis nodes.

2. The apparatus according to claim 1, wherein one of the variables represents a hypothesis node in a graphical model of a Bayesian network and the other variables represent parent nodes in the model whose states determine the state of the hypothesis node.

3. The apparatus according to claim 2, wherein the display includes a representation of a combination of the states of the parent nodes.

4. The apparatus according to claim 3, wherein the combination includes the state of one of the parent nodes being the most significant state and the state of each of the other parent nodes not being the most significant state.

5. The apparatus according to claim 4, wherein the combination further includes the states of all the parent nodes not being their most significant states.

6. The apparatus according to claim 5, wherein the data describing the Conditional Probability Table generated includes remaining combinations of the states of the parent nodes, i.e. the states that were not displayed.

7. The apparatus according to claim 1, wherein the Conditional Probability Table is generated by the apparatus implementing a "Noisy-OR" algorithm.

8. The apparatus according to claim 1, further including a component for allowing a graphical representation of the variables to be created.

9. The apparatus according to claim 8, wherein the states displayed are those of a variable chosen by selecting its said corresponding graphical representation.

10. The apparatus according to claim 8, wherein the apparatus configures the display to display the states of variables corresponding to parent nodes in an order determined by the probability estimates associated with each of those states as inputted using the input means.

11. The apparatus according to claim 8, including a component for allowing the user to set an initial order in which the states of the variables corresponding to parent nodes are displayed.

12. The apparatus according to claim 2, wherein the apparatus generates and displays a question corresponding to the state for which a probability estimate is to be entered using the input means.

13. The apparatus according to claim 12, wherein the question includes text including a name of at least one said state of at least one variable corresponding to at least said parent node and a name of the state of the variable corresponding to the hypothesis node.

14. The apparatus according to claim 1, further including a component for automatically setting the probability estimate for a state reciprocal to the state for which a probability estimate is entered so that the combined probability estimates sum to 1.

15. The apparatus according to claim 1, including a component that only allows the Conditional Probability Table data to be generated after probability estimates for all the displayed combinations of states have been inputted.

16. A computer-implemented method of assisting with constructing data describing a Conditional Probability Table, the method comprising:
displaying a representation of a set of states, each one of the states being associated with a corresponding variable, the states being ordered in a hierarchy based on a selected significance level by a user, wherein at least one of the states displayed is designated as being a most significant state for the corresponding variable;
receiving an input representing a probability estimate to be associated with a said displayed state; and
generating data describing a Conditional Probability Table using the inputted probability estimates;
wherein each variable represents a node having a plurality of potential states which are ordered based on the selected significance level by the user, and
wherein the hierarchy includes nodes positioned in a three-layer structure, which includes a context layer, a hypotheses and alternative hypotheses layer, and an evidence layer, so that influence works downwards and inference works upwards, and wherein the state of the context nodes influences the state of the hypothesis nodes and the alternative hypothesis nodes, which in turn influence the state of the evidence nodes, and wherein the state of the hypothesis nodes and the alternative hypothesis nodes is inferred from the state of the evidence nodes, and the state of the evidence nodes is inferred from the hypothesis nodes and the alternative hypothesis nodes.

17. The method according to claim 16, further comprising:
constructing a graphical model of a problem domain, the model including a set of nodes corresponding to the variables and links between at least some of the nodes.

18. The method according to claim 17, further comprising:
including creating data representing the states of a said variable.

19. The method according to claim 16, wherein the input is based on information elicited by an expert during an interview process.

20. A computer program product having a non-transitory computer readable medium having a computer program code arrangement executable by a computer, comprising:
computer program code to perform the following:
displaying a representation of a set of states, each one of the states being associated with a corresponding variable, the states being ordered in a hierarchy based on a selected significance level by a user, wherein at least one of the states displayed is designated as being a most significant state for the corresponding variable;
receiving an input representing a probability estimate to be associated with a said displayed state; and
generating data describing a Conditional Probability Table using the inputted probability estimates;
wherein each variable represents a node having a plurality of potential states which are ordered based on the selected significance level by the user, and
wherein the hierarchy includes nodes positioned in a three-layer structure, which includes a context layer, a hypotheses and alternative hypotheses layer, and an evidence layer, so that influence works downwards and inference works upwards, and wherein the state of the context nodes influences the state of the hypothesis nodes and the alternative hypothesis nodes, which in turn influence the state of the evidence nodes, and wherein the state of the hypothesis nodes and the alternative hypothesis nodes is inferred from the state of the evidence nodes, and the state of the evidence nodes is inferred from the hypothesis nodes and the alternative hypothesis nodes.

21. A computer-implemented method of assisting with constructing data describing a Conditional Probability Table, the method comprising:
prompting a user to input data representing a set of probability estimates to be associated with a set of states, each one of the states being associated with a corresponding variable;
ordering the states in a hierarchy based on a selected significance level by a user, wherein at least one of the states is designated as being a most significant state for the corresponding variable; and
using the inputted data to generate a Conditional Probability Table, wherein the inputted data corresponds to a subset of the Conditional Probability Table;
wherein each variable represents a node having a plurality of potential states which are ordered based on the selected significance level by the user, and
wherein the hierarchy includes nodes positioned in a three-layer structure, which includes a context layer, a hypotheses and alternative hypotheses layer, and an evidence layer, so that influence works downwards and inference works upwards, and wherein the state of the context nodes influences the state of the hypothesis nodes and the alternative hypothesis nodes, which in turn influence the state of the evidence nodes, and wherein the state of the hypothesis nodes and the alternative hypothesis nodes is inferred from the state of the evidence nodes, and the state of the evidence nodes is inferred from the hypothesis nodes and the alternative hypothesis nodes.

22. A computer-implemented method of constructing data for use in an expert system, the method comprising:

constructing a graphical model of a problem domain, the model including a set of nodes and links between at least some of the nodes;
entering probability estimates associated with at least one state of at least some of the nodes;
generating probability estimates for at least some of the remaining links in the model;
displaying a representation of the at least one state of at least some of the nodes, the at least one state being associated with a corresponding node, the at least one state being ordered in a hierarchy with other states of the corresponding node based on a selected significance level by a user, wherein the at least one state displayed is designated as being a most significant state for the corresponding node; and
generating data for use in an expert system using the constructed model, the entered probability estimates and the generated probability estimates;
wherein each node has a plurality of potential states which are ordered based on the selected significance level by the user, and
wherein the hierarchy includes nodes positioned in a three-layer structure, which includes a context layer, a hypotheses and alternative hypotheses layer, and an evidence layer, so that influence works downwards and inference works upwards, and wherein the state of the context nodes influences the state of the hypothesis nodes and the alternative hypothesis nodes, which in turn influence the state of the evidence nodes, and wherein the state of the hypothesis nodes and the alternative hypothesis nodes is inferred from the state of the evidence nodes, and the state of the evidence nodes is inferred from the hypothesis nodes and the alternative hypothesis nodes.

23. A computer-implemented method of generating a set of probability estimates for a state of a child variable, the method comprising:
assigning a probability estimate indicating a likelihood of the state of the child variable, having a plurality of possible states, the state of the child variable being dependent upon states of a plurality of parent variables, wherein each of the parent variables has a plurality of possible states, the possible states being ordered in a hierarchy based on a selected significance level by a user, with one of the possible states of each said parent variable being designated as a most significant state for that parent variable, resulting from each of the following combinations of the states of the parent variables:
the state of one of the parent variables is the most significant state while the state of all the other parent variables is not the most significant state, with this combination of parent variable states being produced for each one of the parent variables; and
using a Noisy-Or algorithm to generate a set of probability estimates indicating the likelihood of the state of the child variable resulting from at least some other combinations of the states of the parent variables;
wherein each variable represents a node having a plurality of potential states which are ordered based on the selected significance level by the user, and
wherein the hierarchy includes nodes positioned in a three-layer structure, which includes a context layer, a hypotheses and alternative hypotheses layer, and an evidence layer, so that influence works downwards and inference works upwards, and wherein the state of the context nodes influences the state of the hypothesis nodes and the alternative hypothesis nodes, which in turn influence the state of the evidence nodes, and wherein the state of the hypothesis nodes and the alternative hypothesis nodes is inferred from the state of the evidence nodes, and the state of the evidence nodes is inferred from the hypothesis nodes and the alternative hypothesis nodes.

24. The method according to claim 23, further comprising:
using the assigned probability estimates and the generated set of probability estimates to generate a Bayesian Network representing the relationship between the parent and child variables.

25. The method according to claim 23, wherein the child variable represents a risk that an individual onboard a vehicle is malevolent.

26. An apparatus to assist with constructing data describing a Conditional Probability Table, comprising:
a display device to display a representation of a set of states, each one of the states being associated with a corresponding variable, the states being ordered in a hierarchy based on a selected significance level by a user, wherein at least one of the states displayed may be designated as being a most significant state for the corresponding variable;
an input device to receive an input representing a probability estimate to be associated with a said displayed state; and
a component to use the inputted probability estimates to generate data describing a Conditional Probability Table;
wherein each variable represents a node having a plurality of potential states which are ordered based on the selected significance level by the user, and
wherein the hierarchy includes nodes positioned in a three-layer structure, which includes a context layer, a hypotheses and alternative hypotheses layer, and an evidence layer, so that influence works downwards and inference works upwards, and wherein the state of the context nodes influences the state of the hypothesis nodes and the alternative hypothesis nodes, which in turn influence the state of the evidence nodes, and wherein the state of the hypothesis nodes and the alternative hypothesis nodes is inferred from the state of the evidence nodes, and the state of the evidence nodes is inferred from the hypothesis nodes and the alternative hypothesis nodes.

27. A computer-implemented method of assisting with constructing data describing a Conditional Probability Table, the method comprising:
displaying a representation of a set of states, each one of the states being associated with a corresponding variable, the states being ordered in a hierarchy based on a selected significance level by a user, wherein at least one of the states displayed may be designated as being a most significant state for the corresponding variable;
receiving an input representing a probability estimate to be associated with a said displayed state; and
generating data describing a Conditional Probability Table using the inputted probability estimates;
wherein each variable represents a node having a plurality of potential states which are ordered based on the selected significance level by the user, and
wherein the hierarchy includes nodes positioned in a three-layer structure, which includes a context layer, a hypotheses and alternative hypotheses layer, and an evidence layer, so that influence works downwards and inference works upwards, and wherein the state of the context nodes influences the state of the hypothesis nodes and the alternative hypothesis nodes, which in turn influence the state of the evidence nodes, and wherein the state of the hypothesis nodes and the alternative hypothesis nodes is inferred from the state of the evidence nodes, and the state of the evidence nodes is inferred from the hypothesis nodes and the alternative hypothesis nodes.

28. A computer program product having a non-transitory computer readable medium having a computer program code arrangement executable by a computer, comprising:
   computer program code to perform the following:
      displaying a representation of a set of states, each one of the states being associated with a corresponding variable, the states being ordered in a hierarchy based on a selected significance level by a user, wherein at least one of the states displayed may be designated as being a most significant state for the corresponding variable;
      receiving an input representing a probability estimate to be associated with a said displayed state, and
      generating data describing a Conditional Probability Table using the inputted probability estimates;
   wherein each variable represents a node having a plurality of potential states which are ordered based on the selected significance level by the user, and
   wherein the hierarchy includes nodes positioned in a three-layer structure, which includes a context layer, a hypotheses and alternative hypotheses layer, and an evidence layer, so that influence works downwards and inference works upwards, and wherein the state of the context nodes influences the state of the hypothesis nodes and the alternative hypothesis nodes, which in turn influence the state of the evidence nodes, and wherein the state of the hypothesis nodes and the alternative hypothesis nodes is inferred from the state of the evidence nodes, and the state of the evidence nodes is inferred from the hypothesis nodes and the alternative hypothesis nodes.

* * * * *